May 24, 1938.  C. B. HOLT  2,118,350
COUPLER FOR ROTARY WELL DRILLS
Filed Feb. 15, 1937
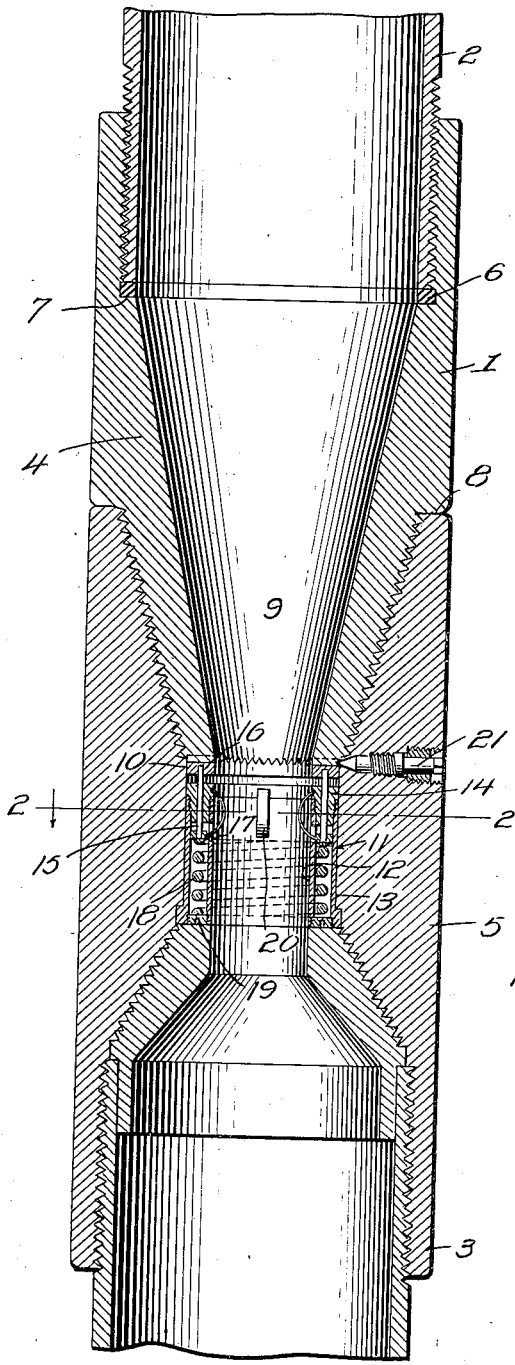
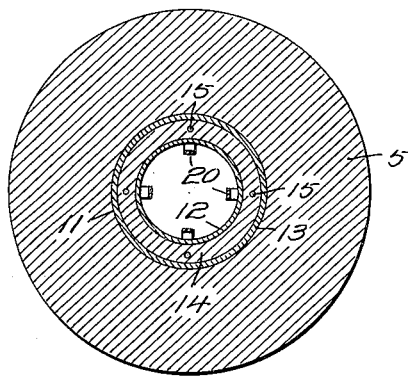
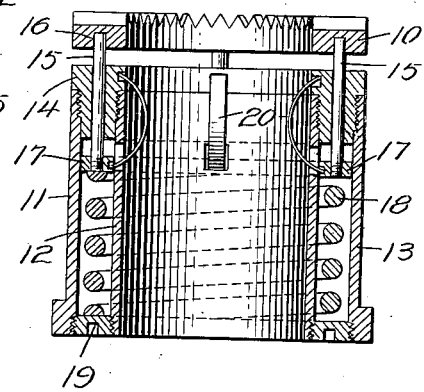
C. B. Holt,
INVENTOR
BY Victor J. Evans & Co.
ATTORNEYS Patented May 24, 1938

2,118,350

UNITED STATES PATENT OFFICE 2,118,350

COUPLER FOR ROTARY WELL DRILLS

Clinton B. Holt, Cotton Valley, La., assignor of one-half to E. P. Lewis, Cotton Valley, La.

Application February 15, 1937, Serial No. 125,882

3 Claims. (Cl. 285—146)

This invention relates to couplers for rotary well drills and has for the primary object the provision of a device of this character which will assure a safe and positive connection for detachably joining sections of a drill rod and which may be easily and quickly actuated to uncouple the rod sections either from the interior or exterior thereof and includes means for protecting the threads employed in the coupling from damage or wear during the well drilling operation.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating a coupler for rotary well drills and which is constructed in accordance with my invention.

Figure 2 is a sectional view taken on the line 2—2 of Figure 1.

Figure 3 is an enlarged vertical sectional view illustrating a locking means employed in the construction of the coupler.

Referring in detail to the drawing, the numeral 1 indicates in entirety a coupler especially adapted for joining sections of a rotary well drilling rod, the sections being indicated by the characters 2 and 3, and are externally screw threaded.

The coupler 1 consists of a male element 4 and a female element 5. The section 2 of the drill rod is threaded into the male element 4 and between the latter and the section 2 is a gasket 6 held in sealed engagement with a shoulder 7 by the section 2. The male element 4 tapers towards one end and is externally screw threaded and provides a shoulder 8 for the female member to abut. The bore of the male element which is indicated at 9 tapers from the section 2 towards the tapered end of said male member. The female member 5 has one end tapered to match the taper of the male member and is internally screw threaded to match the screw threads on the tapered end of said male member. These screw threads detachably connect the male and female members. The bore of the female member has a non-threaded portion and located in said non-threaded portion is a locking ring 10 and also a yieldable mounting 11 for the locking ring. The locking ring has teeth to match or mesh with teeth on the tapered end of the male member. The mounting 11 includes inner and outer spaced connected sleeves 12 and 13. The connection between said sleeves 12 and 13 at one end is in the form of an annular member 14 which slidably supports pins 15 adapted to enter sockets 16 in the locking ring and suitably secured in the sockets to prevent rotation of the locking ring. The pins 15 are connected by an annular ring 17 operating between the sleeves 12 and 13 and forms a seat for one end of a coil spring 18, the other end of said spring engaging the element 19 which joins the other end of the sleeves 12 and 13. The spring 18 acts to urge the pins 15 into the sockets 16 of the locking ring, consequently acting to retain the teeth of the locking ring in mesh with the teeth of the male member. The mounting 11 is suitably secured in the female member against movement. Therefore, it is impossible to unthread the male member from the female member until the locking ring is disengaged from the male member. The disengagement of the locking ring from the male member can be accomplished in two ways, one by passing through the hollow coupling a tapered plug to engage and flex spring fingers 20 secured to the ring 17. The weight of the plug is sufficient to move the locking ring out of engagement with the male member, or the locking ring may be disengaged from the male member by a set pin 21 having threaded engagement with the female member and operated from the exterior of the latter. By threading the set pin inwardly it will engage the end of the male member and the locking ring and due to its pointed end will force the locking ring out of engagement with the male member.

A coupling of the character described will assure against accidental separation of sections of the drill rod and when it is desired to uncouple said sections the locking means heretofore described in detail may be easily operated from the interior of the coupler or from the exterior thereof.

What is claimed is:

1. A coupler comprising male and female members, a screw threaded connection between said members, teeth formed on the male member, a locking ring carried by the female member to engage the teeth of the male member to prevent unthreading of said male and female members, a spring mounting secured in the female member and including spring pressed pins to engage the locking ring to prevent rotation thereof and to urge the locking ring into a position so that it will engage the teeth of the male member, and means located in the female member and connected to said pins to be engaged by a plug passed through the male and female members for disengaging the locking ring from the male member.

2. A coupler comprising male and female members, a screw threaded connection between said members, teeth formed on the male member, a locking ring carried by the female member to engage the teeth of the male member to prevent unthreading of said male and female members, a spring mounting secured in the female member and including spring pressed pins to engage the locking ring to prevent rotation thereof and to urge the locking ring into a position so that it will engage the teeth of the male member, and spring fingers located in the mounting and connected to the pin to be engaged by a plug for disengaging the locking ring from the teeth of the male member.

3. A coupler comprising male and female members, a screw threaded connection between said members, teeth formed on the male member, a locking ring including teeth slidable in the female member to engage and disengage the teeth of the male member, a mounting secured in the female member and including spaced inner and outer sleeves, a connecting member securing said sleeves together, pins slidably supported by said connecting member and secured to the ring, and an annular member slidable between said sleeves and connecting the pins, a spring between the sleeves and acting on said annular member to force the teeth of the ring into the teeth of the female member, means threaded on said sleeves and acting as an adjustable seat for the spring, and spring fingers secured on said connecting member and the annular member to be engaged by a tool for disengaging the teeth of the locking ring from the teeth of the male member.

CLINTON B. HOLT.